United States Patent [19]
May et al.

[11] Patent Number: 5,544,714
[45] Date of Patent: Aug. 13, 1996

[54] QUICK-CONNECT FASTENER AND VIBRATION ISOLATOR UNIT FOR ATTACHMENT OF AUTOMOTIVE COMPONENTS

[75] Inventors: Robert J. May, Livonia; Stephen E. Gabalis, Washington; Todd S. Weakley, Waterford, all of Mich.

[73] Assignee: Chrysler Corporation, Auburn Hills, Mich.

[21] Appl. No.: 247,152

[22] Filed: May 18, 1994

[51] Int. Cl.⁶ ................................................ B60K 11/04
[52] U.S. Cl. ............................ 180/68.4; 165/67; 248/635; 248/232; 292/251
[58] Field of Search ..................................... 180/68.4, 300, 180/312; 248/635, 232, 233; 165/67, 69; 292/251, DIG. 16

[56] References Cited

U.S. PATENT DOCUMENTS

| | | | |
|---|---|---|---|
| 4,306,615 | 12/1981 | Bolton et al. | 165/67 |
| 4,579,184 | 4/1986 | Hiramoto | 180/68.4 |
| 4,651,839 | 3/1987 | Isobe | 180/68.4 |
| 4,770,234 | 9/1988 | Hiraoka et al. | 165/67 |
| 4,858,866 | 8/1989 | Werner | 248/635 |
| 5,078,224 | 1/1992 | Attinger et al. | 180/68.4 |
| 5,219,016 | 6/1993 | Bolton et al. | 165/41 |
| 5,291,961 | 3/1994 | Attinger et al. | 180/68.4 |
| 5,335,893 | 8/1994 | Opp | 248/635 |

FOREIGN PATENT DOCUMENTS 1782779  12/1992  U.S.S.R. ...................... 180/68.4

*Primary Examiner*—Eric D. Culbreth
*Assistant Examiner*—Michael Mar
*Attorney, Agent, or Firm*—Kenneth H. MacLean

[57] ABSTRACT

Assembly of a radiator into the engine compartment of an automotive vehicle is quickly accomplished by raising the radiator with its lower support until projecting pins on the top of the radiator extend through a pair of openings in the upper cross member. A fastener and isolator unit is initially installed on each of the pins so that a lower retainer of the hard plastics main body of each unit inserted through the respective slot is immediately below the lower surface of the cross member while an upper retainer is located above the upper surface of the cross member. Installation is effected by gripping ears on the upper retainer and turning the unit on the pin until camming and positioning surfaces of a neck connecting the upper and lower retainers engage the edges defining the slot while trapping the cross member between the upper and lower retainers to secure the unit thereto. A vibration damper and isolator of resilient rubber-like material forms part of the unit to dampen and control vibration between the pins and the cross member while an integral rubber bumper supported on the lower retainer damps vertical vibratory motions between the radiator and the upper cross member.

8 Claims, 3 Drawing Sheets

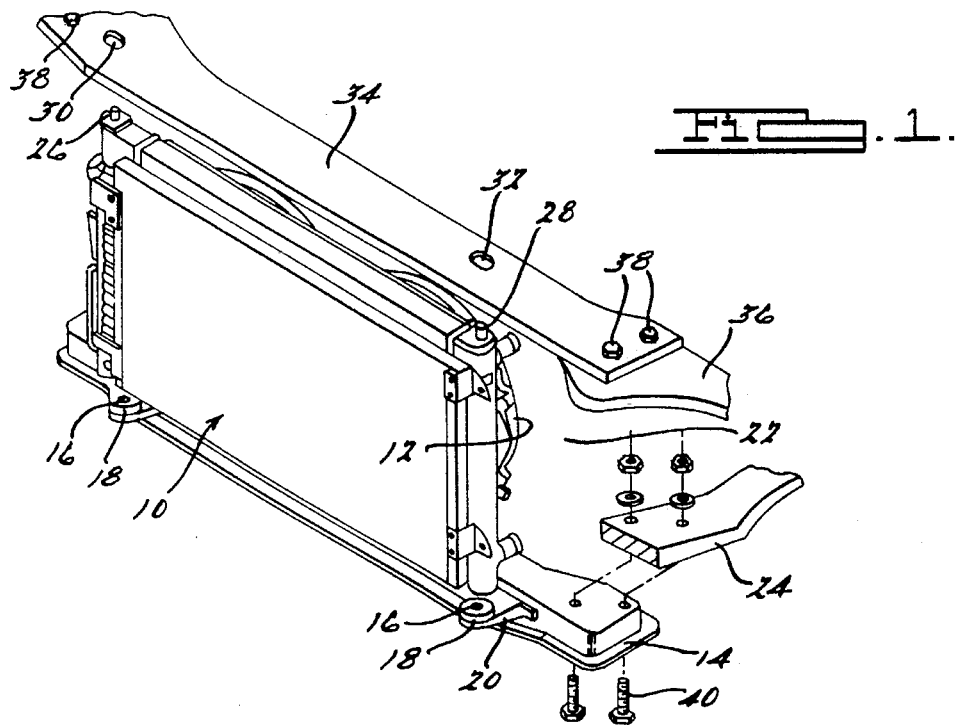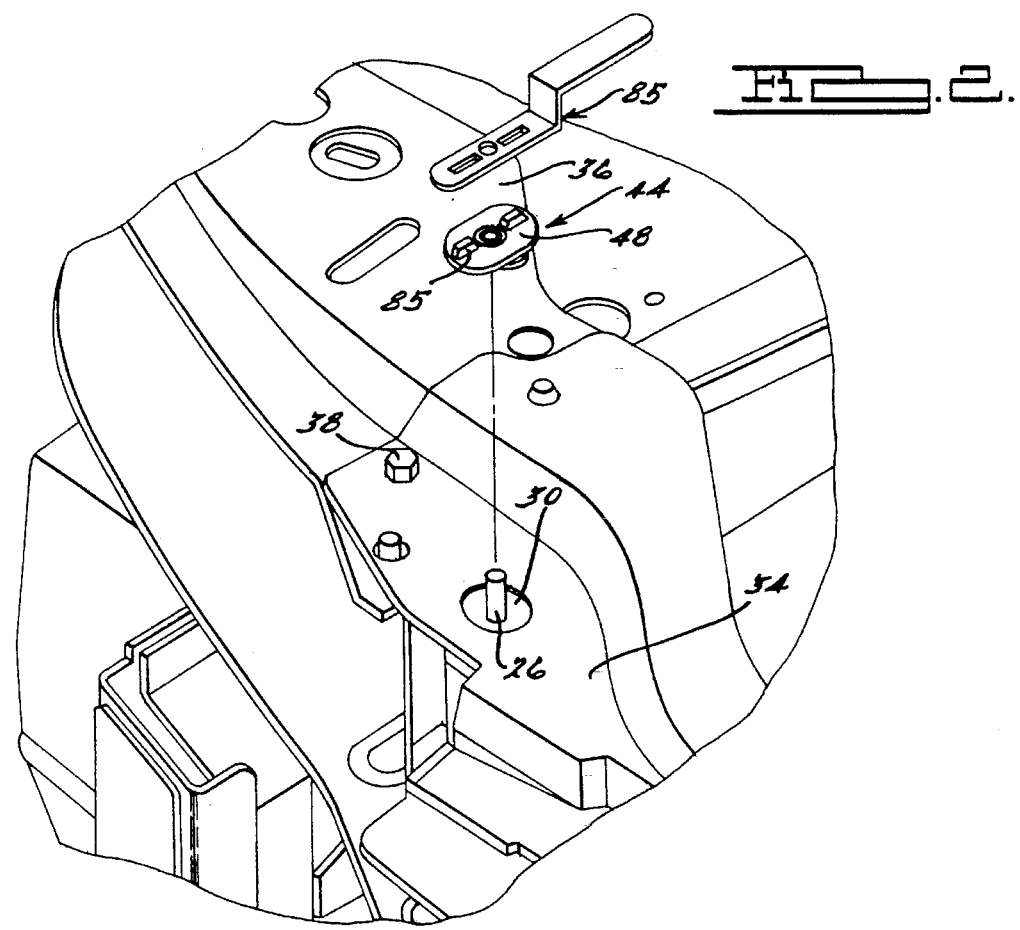

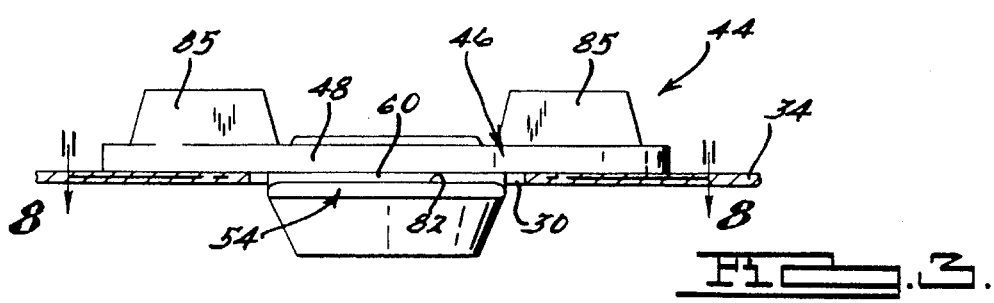
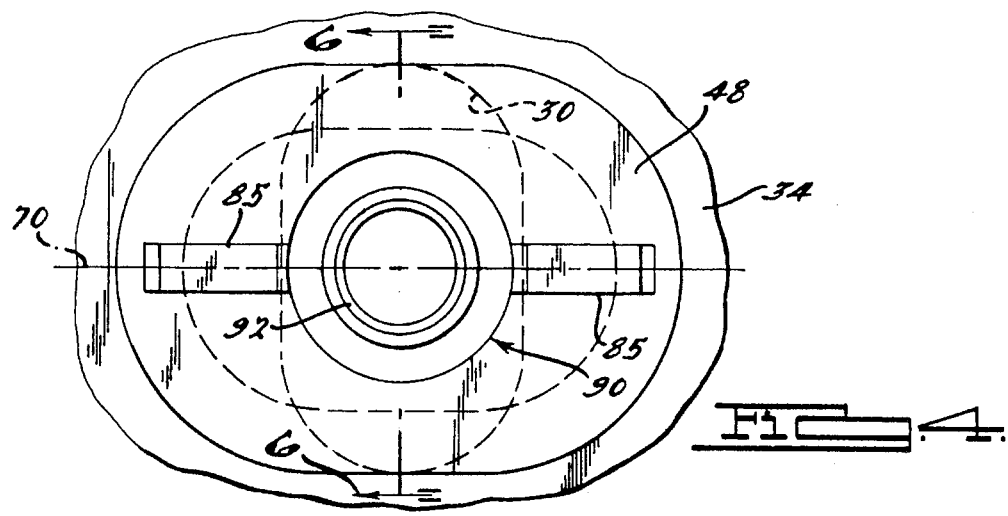
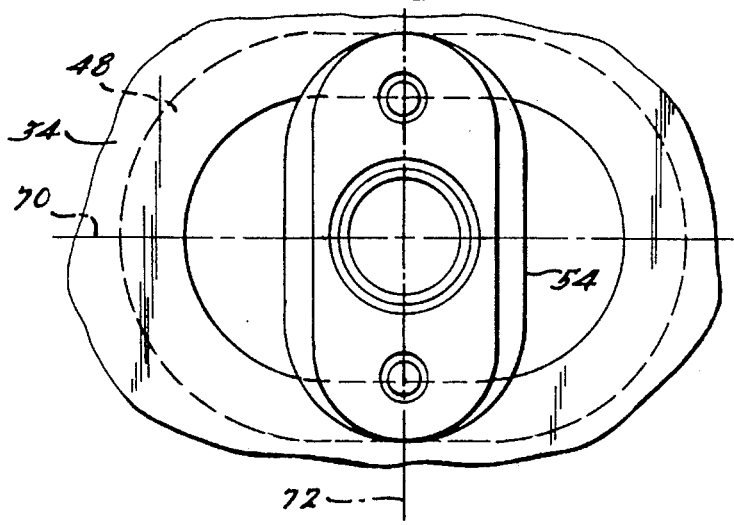
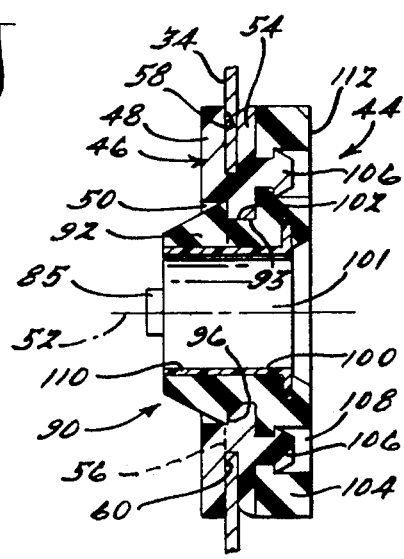

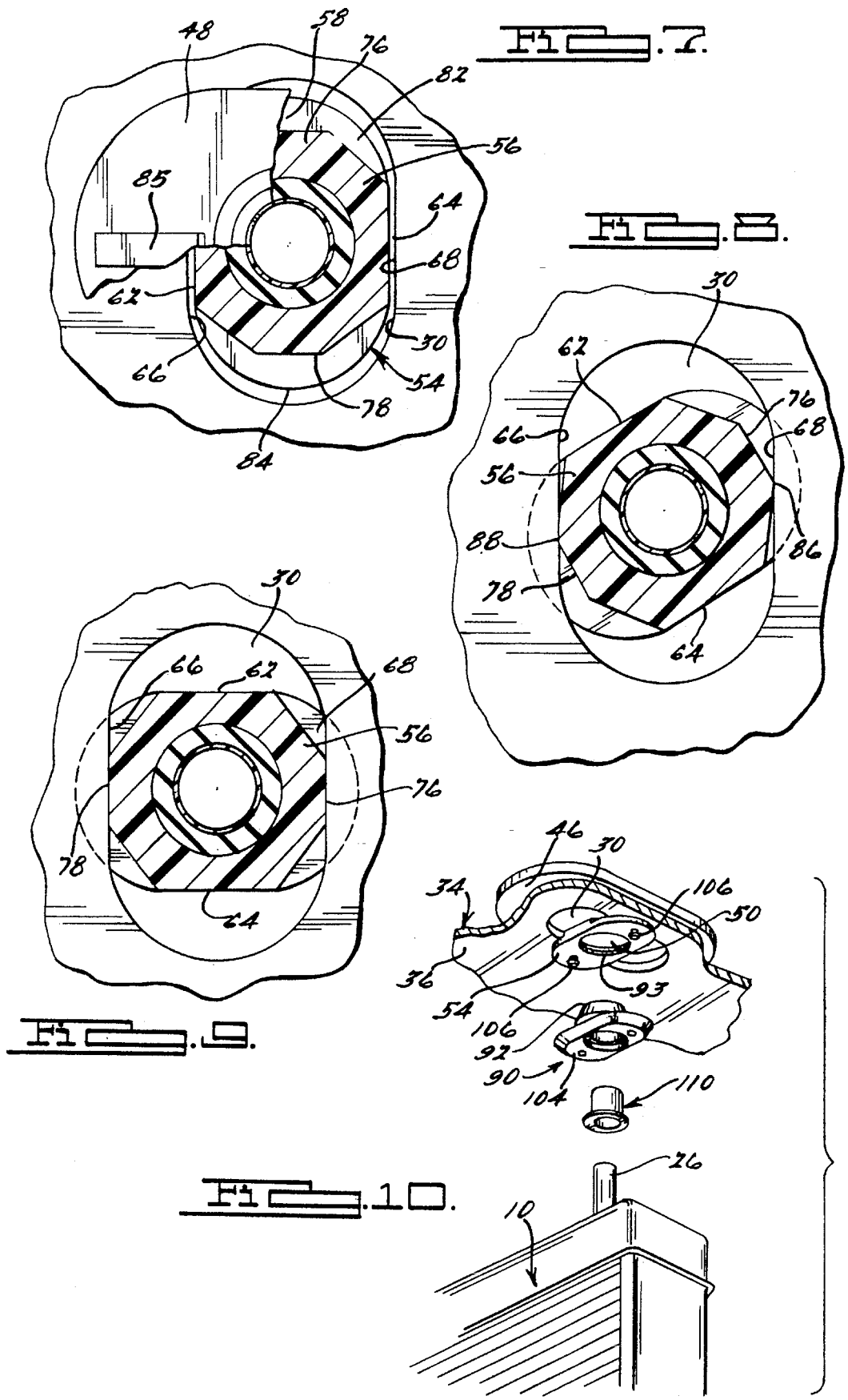

QUICK-CONNECT FASTENER AND VIBRATION ISOLATOR UNIT FOR ATTACHMENT OF AUTOMOTIVE COMPONENTS

TECHNICAL FIELD

This invention relates generally to fasteners with vibration isolation and damping capabilities, and more particularly, to a new and improved quick-connect fastener and isolator unit mounting automotive components such as an engine cooling radiator to support structure within a vehicle.

BACKGROUND OF THE INVENTION

Prior to the present invention, various fastener construction and systems have been employed to mount vehicle engine cooling radiators so that they are vibrationally isolated while being retained in their designed position with respect to upper and lower supports or to other structure in the vehicle. Examples of such systems are disclosed in prior U.S. Pat. No. 5,219,016 for RADIATOR, CONDENSER AND FAN SHROUD ASSEMBLY, 5,078,224 for RADIATOR MOUNTING FOR MOTOR VEHICLES, 4,651,839 for RADIATOR SUPPORTING DEVICE, and 4,579,184 for RESILIENTLY MOUNTED RADIATOR ASSEMBLY.

While these prior fastener constructions have meritorious features, they employ a wide range of threaded fastener devices, special brackets and resilient members to isolate and operationally secure the associated radiator to its support structure within the vehicle. Such prior connector constructions are relatively complex and generally involve tedious and time consuming work effort to install or remove the radiator. Often such systems restrict the radiator isolation such as by hard point fastening or by high isolator preload securement so that resonant vibrations may be induced into the radiator assembly which may adversely effect its service life.

SUMMARY OF THE INVENTION

In modern vehicle assembly, the engine cooling radiator and air conditioner condenser module and other components may be installed into the engine compartment of the vehicle from a position beneath the vehicle during engine decking and with the upper reinforcing cross member in place. This invention is particularly useful in such assembly procedures with the radiator being provided with a pair of upper, laterally-spaced retaining pins which project from the top end thereof. During installation, the radiator mounted on isolators on the lower cross arm member is raised with other components until the upper pins are inserted through a pair of over-sized elongated slots in the upper cross arm member.

Once the attachment pins have been inserted through the slots, the quick-connect fasteners and vibration isolator units featured in this invention are inserted over the pins and partly through the slots in the cross member to establish an initial or pre-connect position. The fastener and isolator units are then turned, preferably about 90° and usually with tooling so that the unit firmly locks into place onto the sheet material of the cross member. The sheet material surrounding and defining the slots or holes is physically contacted and trapped by structure of the fastener unit.

More particularly, the fastener and isolator unit comprises a molded connector body of a relatively hard plastics material with a camming neck portion connecting elongated upper and lower retainers which have their major axes disposed at 90° with respect to one another. The lower retainer is sized to readily pass through the slot when longitudinally aligned therewith and displaced downwardly therethrough to establish the initial or pre-connect position. The upper retainer is preferably larger in both length and width as compared to the slot. By turning the unit on the pin after pre-connect, the sheet material of the upper cross member extending between upper and lower retainers is firmly captured while diametrically opposed and flattened contact surfaces of the neck portion engage and have face-to-face contact with opposing edges defining the width of the slot to complete secure connection to the upper cross arm.

Effective vibration isolation preventing undue wear and noise generation by the radiator is accomplished in this invention by a special resilient damper member of rubber or rubber-like material secured to the connector body. The lower end of the damper member comprises a thickened body of rubber material forming a bumper that generally corresponds to the plan view dimensions of the lower retainer and is secured thereto.

Integral with and extending upwardly from the bumper is a neck-like portion supporting an upper conical head. The head and neck portions of the damper member provide an annular external groove that receives an annular retention edge formed by the neck portion of the stiff plastics connector body for securing these parts together.

The damper has a central opening with an internal diameter sized to receive an attachment pin of the radiator. A cylindrical load spreading sleeve of nylon or other suitable material is installed in the opening in the damper member so that it will be between the pin and the wall of the opening to reduce frictional wear in response to the limited vertical vibratory movement of the radiator with damping provided by the lower end of the damper member. Radial and compound vibratory motions between the pin and the support are primarily damped by the neck portion of the damper member.

The lower end of the damper member forms a bumper which preferably has clearance with the top of the radiator. Vibrating motions of the radiator relative to the upper cross member are damped by the bulging and deflection of the resilient bumper on mechanical contact between the radiator and the lower surface of the bumper.

Furthermore with this invention, the installer by turning the fastener and isolator unit through a predetermined angle preferably with tooling will know by feel and sight that the radiator is properly attached to the upper support. This invention further enhances removal and repair or replacement of the radiator with the quick-connect fasteners being turned from their connect position back to the pre-connect position. The fasteners can be then removed along with the upper cross member to allow convenient access to the radiator for removal and repair. The fastener units experience little or no damage during these procedures so that they can be reused for retention purposes.

The quick-connect fastener and isolator unit of this invention accordingly differs structurally and operationally from prior securing devices or systems isolating and securing cooling modules in operative positions in the engine compartment. Prior bracketry, threaded fasteners and associated dampers which require time consuming and high mechanical effort to secure radiators and other cooling modules to supports are eliminated with this invention which provides assured quick securement with improved isolation.

BRIEF DESCRIPTION OF THE DRAWINGS

These and other features, objects and advantages of this invention will become more apparent from the following detailed description and drawings in which:

FIG. 1 is an exploded pictorial view of a radiator and lower support arm assembly being raised into connection with an upper support arm in a vehicle engine compartment;

FIG. 2 is a fragmented pictorial view of the radiator of FIG. 1 prior to the installation of the quick-connect fastener and vibration isolator unit and the associated tool to connect the radiator to the upper support arm;

FIG. 3, 4 and 5 are respectively side elevation, top and bottom views of one preferred embodiment of the quick-connect fastener and vibration isolator unit of this invention;

FIG. 6 is an enlarged sectional view taken along sight lines 6—6 of FIG. 3;

FIG. 7 is a top view similar to FIG. 4 but with parts broken away to show the initial installation of the fastener unit to the radiator and upper support arm;

FIGS. 8 and 9 are views taken generally along sight lines 8—8 of FIG. 3 but with parts moved to show the operation of the unit to quick-connect of the radiator to the upper support arm; and FIG. 10 is an exploded pictorial view of the quick-connect slotted upper cross member and the radiator.

DETAILED DESCRIPTION OF THE PREFERRED EMBODIMENT

Turning now in greater detail to the drawings, there is shown in FIG. 1 an air conditioner condenser and cross flow engine cooling radiator assembly 10 with rearwardly attached fan unit 12. This unit is mounted to a lower support cross member 14 by pins 16 that fit in resilient elastomer isolators 18 fixed in arms 20 that are attached to and extend from the lower cross member. The radiator and the lower support cross member are raised upwardly in the engine compartment 22 of the vehicle body during engine decking and displaced until the lower cross member is positioned beneath frame side rails such as side rail 24. Also, pins 26, 28 which project upwardly from the opposite side tanks of the radiator extend through the elongated and laterally spaced oval slots 30, 32 formed in the upper cross member 34. The upper cross member is secured at opposite ends to support structure 36 by threaded fasteners 38.

After the lower cross member and radiator assembly have been moved into the described position, threaded fasteners 40 are employed to secure the lower cross member 14 to the side rails. The radiator is accordingly held in place for assured retention and vibration isolation between the upper and lower cross member by the quick-connect fastener and vibration isolator unit 44 of this invention.

FIGS. 3 through 9 show details of one preferred embodiment of the isolator unit 44 that has a main connecting body 46 of a relatively stiff plastics material. This connecting body has a flat, oval-shaped and plate-like upper retainer 48 that is larger in longitudinal and lateral dimensions than corresponding dimensions of the oval shape slots 30 and 32. The connector body 46 has a stepped annular opening 50 therethrough, around a central axis 52. The body 46 has a plate-like lower retainer 54 spaced at a predetermined distance from the upper retainer by an annular camming and retention neck portion 56 externally profiled with outer surfaces defining an octagon (See FIGS. 6–9).

The upper and lower retainers 48 and 54 being spaced from one another by the neck portion 56 integral therewith provide a pair of diametrically opposed retainer slots 58, 60 therebetween which are adapted to receive opposing wall portions of the upper cross member 34 defining the slot 30 or 32 therebetween when the body is turned from the FIG. 7 to the FIG. 9 position.

As shown in FIG. 7, the lower retainer 54 and the octagonally profiled portion of the neck 56 are dimensioned so that they can be readily inserted through the retainer slot 30 or 32. The opposite sides 62 and 64 defining the minor axis limits of the neck are in the initial or pre-installed position spaced from the opposing side edges 66 and 68 of the retainer slot.

The upper retainer 48 is dimensioned to be larger than the retainer slot so that the lower face of the upper retainer lays on top of the upper cross member covering the retainer slot and with its major axis 70 disposed at a 90° with respect to the major axis 72 of the lower retainer 54 (FIGS. 4 and 5).

FIGS. 3, 6 and 7 further illustrate the retention slots 58 and 60 formed between the minor dimension end portions of the upper retainer and underlaying major dimensioned end portions of the lower retainer. Opposite edges 76 and 78 of the octagonal neck define the inner limits of the retention slots 58 and 60. The edges 76 and 78 are parallel to one another and are spaced on the major axis of the octagonal neck at a distance from one another that is substantially equal to the width of the upper cross member slot 30 and 32.

As best shown in FIGS. 6 and 7, the upper surfaces 82, 84 of the lower retainer are curved to provide ramping surfaces to augment the capture of opposing wall portions of the upper cross member adjacent to openings 30, 32 when the fastener is rotated 90° from the FIG. 7 to the FIG. 9 position.

Accordingly, as the upper ears 85 projecting upwardly from retainer 48 are engaged by tooling, such as wrenching hand tool 85' of FIG. 2, or by manual gripping, the body can be turned through its 90° rotation on pin 26 from FIG. 7 to FIG. 9, for example. The opposing surfaces on opposite sides of the slot will be ramped and captured between the upper and lower retainers so that the body of the fastener is securely gripped therebetween. As the neck 56 is moved into the FIG. 8 position, corners such as corners 86, 88 of the octagonal neck engage the sides of the slots 30 providing resistance and noticeable "feel" to further turning. However, by increasing the turning force, the corners are deflected or slightly grooved by the interfering edges so that the full installation position of FIG. 9 can be obtained in which opposing side edges 76, 78 of the octagonal neck are in physical face-to-face contact with the opposing side edges 66, 68 of the slot 30 or 32. Also, the ears and the upper retainer have been turned 90° so that visual indication of the proper installation of the retainer is provided.

In this invention, the resilient rubber isolator 90 is formed with a conical head 92 which can be deflected to fit through the stepped opening 50 having its smallest diameter 93 formed by the internal diameter of the neck portion 56 of the main body of the connector. The conical head has a lower annular surface 96 that, on recovery, seats on the upper surface of the neck portion around the internal diameter 93 thereof. The isolator also defines a cylindrical collar 100 provided by an inner wall of the isolator and provides a cylindrical opening 101 sized to receive pin 26 or 28 therethrough. An annular groove 102 formed in the isolator receives the inner annular band portion of the main body providing the internal diameter 93 to retain the isolator on the main body. The isolator has an oval lower bumper 104 whose upper surface fits against the lower retainer 54 and is fastened thereto by headed projections 106 that extend from the lower retainer through counterbore-like openings 108 in the bumper and short of the lower or contact surface 112 thereof.

Disposed within the central opening 101 in the rubber isolator is a cylindrical nylon wear sleeve 110 which defines the annular limits of the central annular opening of the fastener and isolator unit which is sized to receive the pin 26 or 28 of the radiator or of the fastener and isolator unit which other heat exchange unit to allow the pin to vibrate relative to the upper retainer with load spreading provided by the sleeve. This also prevents undue wear of the rubber and reduces any set in the isolator.

The bumper 104 of the resilient isolator is slightly spaced from the radiator in the installed position so that there is no pre-load between these two components. However, on sufficient amplitude of vibrations, the bumper will be contacted and deflected by the radiator to effectively dissipate impact loads between these two components while damping vibration.

Accordingly with this invention, the radiator is effectively isolated and vibrations are damped by the resilient bulging or flexing of the material of the isolator. Installation and removal of the radiator is enhanced by the easy twist on and twist off of the fastener and isolator unit.

While a preferred embodiment of the invention has been shown and described, other embodiments will now become apparent to those skilled in the art. Accordingly, this invention is not to be limited to that which is shown and described but by the following claims.

What is claimed is:

1. A quick-connect fastener for attaching a component to a support having a slot therethrough with spaced and opposing side edges facing one another, the component having a pin projecting through said slot, said fastener comprising a body member having upper and lower retainers and a neck portion integral with said upper and lower retainers to space said retainers a predetermined distance from one another, an axial opening extending through said retainers and said neck portion for receiving said pin, said lower retainer being dimensioned so that said fastener can be turned to a selected position relative to said slot in said support and inserted therethrough while said upper retainer covers at least a portion of said slot, said neck portion having first peripheral surfaces spaced from said side edges of said slot when said lower retainer is initially inserted through said slot and said pin extends through said axial opening, said neck portion further having second peripheral surfaces radially spaced from said first surfaces, said second surfaces being spaced from one another by a distance substantially equal to the spacing of said side edges of said slot opposing one another, said upper retainer having discrete gripping means so that said fastener can be physically gripped and turned on said pin to a retention position in which said upper and lower retainers secure opposing portions of said support defining said slot therebetween and said second surfaces of said neck portion physically contact said side edges of said slot in said support, said upper and lower retainers having projecting portions extending beyond the side edges of said slot when the fastener is in the retention position, and a resilient rubber-like isolator attached to and supported by said fastener body for vibrationally isolating said component from said support.

2. The fastener of claim 1, wherein said second peripheral surfaces of said neck portion are diametrically opposite external side edges thereof which contact said opposing side edges of said slot when said fastener is turned to said retention position.

3. The fastener of claim 2, wherein said neck portion of said fastener has an internal diameter to define said axial opening, said isolator extending into said axial opening and secured to said neck portion of said fastener.

4. The fastener of claim 3, wherein said isolator has an axial opening with an inner cylindrical wall through which said pin extends and wherein a load spreading cylinder of thin wall material is mounted in said isolator and is operatively disposed between said pin and the inner cylindrical wall of the axial opening of said isolator.

5. Quick-connect fastener and vibration isolator unit for the attachment of a vehicle component with a projecting pin to support structure having an elongated opening with a major axis and a predetermined width defined by opposing edge and receiving said pin therethrough, said unit comprising a fastener body having upper and lower retainers with each having a longitudinal axis respectively disposed in planes that intersect one another, said lower retainer being sized to fit through said elongated opening when in a predetermined position while said upper retainer fits against the upper surface of said support structure to cover a portion of said elongated opening, said fastener body further having a neck operatively connecting said upper and lower retainers, said neck having a cylindrical opening receiving said pin and having external retention and camming surfaces thereon so that rotation of said fastener body through a predetermined angular movement causes said camming surfaces to engage said opposing edges of said elongated opening to securely lock said fastener and vibration isolator unit in an attached position to said support, said upper and lower retainers having projecting portions extending beyond the opposing edges of said elongated opening when the fastener is in the attached position, unit including resilient rubber-like isolator means attached to and supported by said fastener body for isolating said vehicle component from said support structure, said isolator means being yieldable to damp vibrations occurring between said support structure and said vehicle component, said isolator having a cylindrical collar portion therein which receives said projecting pin of said component.

6. The unit of claim 5, wherein said isolator means has a bumper seated on the lower face of said lower retainer and spaced from said component and operative to damp vibration thereof.

7. Quick-connect fastener and vibration isolator unit for the attachment of a vehicle heat exchanger component having attachment pins to flattened support structure having longitudinally extending fastener openings with a major axis and with opposing edges defining a predetermined width for receiving said pins, said unit comprising a fastener body having upper and lower attachment sections spaced from one another by a distance to closely receive the flattened support structure therebetween, each of said sections having longitudinal major axes respectively disposed in planes that intersect one another, said lower section of said unit being adapted to fit through said opening when said major axis thereof is aligned with said major axis of said opening while said upper section covers at least a portion of said opening so that it fits against the upper surface of said support structure, said fastener body having a neck portion connecting said upper and lower attachment sections, said neck portion having a peripheral camming surface thereon so that rotation of said fastener body through a predetermined angular movement causes the edges of said openings to engage and securely lock said fastener, said upper and lower attachment sections having projecting portions extending beyond the edges of said opening when the fastener is locked to the support structure, and vibration isolator unit in an attached position, said fastener body having an axial opening extending through said neck portion for receiving said pin, said unit further having an isolator body formed from rubber-like material operatively secured in said axial opening in said fastener body to damp vibrations occurring between said support structure and said vehicle heat exchanger component.

8. Quick-connect fastener and vibration isolator unit for the attachment of a vehicle component with a projecting pin to support structure having an elongated opening defined in part by opposing edge portions with a major axis and a predetermined width, a fastener body having upper and lower retainers with each having a longitudinal axis respectively disposed in planes that intersect one another, said lower retainer being adapted to fit through said elongated opening when in a predetermined position while said upper section fits against the upper surface of said support structure to cover a portion of said elongated opening, a neck operatively connecting said upper and lower retainers having an axial opening for receiving said pin therethrough and having external retention and camming surfaces thereon so that rotation of said fastener body through a predetermined angular movement causes said camming surfaces to engage opposite edge portions of said elongated opening to securely lock said fastener and vibration isolator unit in an attached position to said support structure, said upper and lower retainers having projecting portions extending beyond the edge portion portions of said elongated opening when the fastener is in the attached position, said unit including resilient rubber-like isolator means supported by said body, said isolator means being yieldable to damp vibrations occurring between said support structure and said vehicle component, said isolator means having a cylindrical collar portion extending through said opening in said neck which receives said projecting pin of said component to damp the vibrations thereof, said isolator means further having a bumper lower spaced from said component and operative to damp vibration thereof, and said isolator having a central head portion secured in said axial opening of said neck of said fastener body and wherein said bumper is further secured to said lower retainer.

* * * * *